United States Patent
Kitanaka (10) Patent No.: US 9,340,111 B2
(45) Date of Patent: May 17, 2016

(54) CONTROL DEVICE FOR ELECTRIC VEHICLE

(75) Inventor: Hidetoshi Kitanaka, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 616 days.

(21) Appl. No.: 13/883,836

(22) PCT Filed: Dec. 1, 2010

(86) PCT No.: PCT/JP2010/071463
§ 371 (c)(1),
(2), (4) Date: May 7, 2013

(87) PCT Pub. No.: WO2012/073351
PCT Pub. Date: Jun. 7, 2012

(65) Prior Publication Data
US 2013/0229052 A1    Sep. 5, 2013

(51) Int. Cl.
| B60L 1/00 | (2006.01) |
| B60L 3/00 | (2006.01) |
| B60L 9/18 | (2006.01) |
| B60L 11/18 | (2006.01) |

(52) U.S. Cl.
CPC ............... *B60L 3/003* (2013.01); *B60L 3/0046* (2013.01); *B60L 9/18* (2013.01); *B60L 11/1803* (2013.01); *B60L 11/1859* (2013.01);
(Continued)

(58) Field of Classification Search
CPC .... B60R 16/033; B60R 16/00; B60R 16/023; B60R 16/0235; B60R 16/0239; B60R 16/03; B60R 16/04; B64D 41/00–41/007
See application file for complete search history.

(56) References Cited

U.S. PATENT DOCUMENTS

| 8,049,455 B2 | 11/2011 | Kitanaka |
| 8,427,004 B2 | 4/2013 | Kitanaka |

(Continued)

FOREIGN PATENT DOCUMENTS

| JP | 2-164201 A | 6/1990 |
| JP | 2001-16701 A | 1/2001 |

(Continued)

OTHER PUBLICATIONS

Office Action issued on Nov. 15, 2014, by the Chinese Patent Office in corresponding Chinese Patent Application No. 201080070447.6, and an English Translation of the Office Action. (9 pages).

(Continued)

*Primary Examiner* — Kenneth B Wells
*Assistant Examiner* — Rafael Pacheco
(74) *Attorney, Agent, or Firm* — Buchanan Ingersoll & Rooney PC (57) ABSTRACT

A control device for an electric vehicle includes a converter circuit that converts a voltage input from an external power supply to a direct current having a predetermined value and outputs the direct current to a power storage unit, an inverter circuit that receives an arbitrary power supply from the external power supply or the power storage unit and converts power to an alternating current having a predetermined value, a converter control unit that controls the converter circuit based on a detection result of an abnormal state of the converter circuit and generates a protection status signal based on the detection result, and a inverter control unit that executes emergency control with respect to the inverter circuit, when the protection status signal is input, which indicates that the converter circuit is in an abnormal state.

16 Claims, 5 Drawing Sheets

(52) U.S. Cl.
CPC ......... *B60L 2200/26* (2013.01); *B60L 2210/10* (2013.01); *B60L 2250/24* (2013.01); *B60L 2260/44* (2013.01); *Y02T 10/705* (2013.01); *Y02T 10/7005* (2013.01); *Y02T 10/7216* (2013.01)

(56) References Cited

U.S. PATENT DOCUMENTS

| | | | |
|---|---|---|---|
| 2009/0267412 A1 | 10/2009 | Kitanaka | |
| 2010/0079093 A1 | 4/2010 | Kitanaka | |
| 2011/0313613 A1* | 12/2011 | Kawahara | H01M 10/441 701/34.4 |

FOREIGN PATENT DOCUMENTS

| | | |
|---|---|---|
| JP | 2008-141877 A | 6/2008 |
| JP | 2009-171772 A | 7/2009 |
| KR | 10-2009-0052897 A | 5/2009 |
| WO | 2008/010281 A1 | 1/2008 |

OTHER PUBLICATIONS

International Search Report (PCT/ISA/210) issued on Feb. 22, 2011, by the Japanese Patent Office as the International Searching Authority for International Application No. PCT/JP2010/071463.

Written Opinion (PCT/ISA/237) issued on Feb. 22, 2011, by the Japanese Patent Office as the International Searching Authority for International Application No. PCT/JP2010/071463.

Office Action (Notice of Preliminary Rejection) issued on Sep. 29, 2014, by the Korean Patent Office in corresponding Korean Patent Application No. 10-2013-7012323, and an English Translation of the Office Action. (8 pages).

* cited by examiner

CONTROL DEVICE FOR ELECTRIC VEHICLE

FIELD

The present invention relates to a control device for an electric vehicle provided for an electric vehicle including a power storage element.

BACKGROUND

Generally, an electric vehicle has such a configuration that the electric vehicle takes in power from an overhead wire by a power collector, uses the power taken therein to drive a motor by an electric power conversion system such as an inverter to run.

In the electric vehicle, at the time of braking the vehicle, a so-called regenerative brake that acquires a braking force by causing a motor to perform a regenerative operation is used. The regenerative power generated at this time is supplied to other power running vehicles present near the vehicle itself or to the load such as an air conditioning system of the vehicle via the overhead wire or the third rail and consumed therein.

However, at early morning, during night, or in unbusy lines in which the number of trains operated is less, another vehicle may not be present near the vehicle itself (the regenerative load may be insufficient), and thus the regenerative power generated by the regenerative brake may not be consumed sufficiently. If the regenerative power of the vehicle itself increases than the power consumed by other vehicles, a trolley voltage increases, thereby tripping various devices connected to the overhead wire due to overvoltage or causing a damage.

Therefore, when the trolley voltage has increased, the inverter device narrows down the regenerative brake and performs regenerative narrowing-down control to suppress generation of the regenerative power. At this time, because the regenerative braking force decreases due to the regenerative narrowing-down control, the braking force, which has decreased and becomes insufficient, is compensated by a friction brake.

On the other hand, use of the friction brake leads to disposal of a part of kinetic energy of the electric vehicle that can essentially regenerate power to the air as heat, which is not desirable from a viewpoint of energy saving.

Therefore, such a system has been developed that a power storage element such as a secondary battery or an electric double layer capacitor is mounted on an electric vehicle, to store regenerative power in the power storage element as required, thereby acquiring a stable regenerative brake even if the regenerative load is insufficient.

Furthermore, when the electric vehicle performs power running, the electric vehicle can run while appropriately controlling allocation of electric power supplied from the overhead wire and electric power discharged from the power storage element, which becomes energy saving.

Further, when an electric vehicle mounted with the power storage element runs in a non-electrified section in which reception of electric power from the overhead wire is not performed, only the power from the power storage element is used to drive and accelerate the motor, and all the regenerative power generated by the motor at the time of braking is stored in the power storage element (see, for example, Patent Literature 1).

CITATION LIST

Patent Literature

Patent Literature 1: Japanese Patent Application Laid-open No. 2009-171772

SUMMARY

Technical Problem

According to the invention described in Patent Literature 1 mentioned above, such a configuration is used that power received from an overhead wire via a DC/DC converter and power of a battery as a power storage element are used at the same time to drive a motor by an inverter. When an electric vehicle runs in an electrified section, electric vehicle runs by receiving power from the DC/DC converter and the power storage element in an optimum allocation by the inverter to drive the motor. Furthermore, the DC/DC converter controls the charged amount of the power storage element so as to be sufficient at the time of running in a non-electrified section. On the other hand, when the electric vehicle runs in a non-electrified section, the electric vehicle runs by receiving power only from the power storage element by the inverter to drive the motor. Such a system is useful for an electric vehicle that runs interactively and directly in the electrified section and the non-electrified section.

The DC/DC converter and the inverter here may temporarily become an overvoltage state or an overcurrent state due to transient variation of the voltage or current in the circuit. Therefore, a protection circuit that temporarily stops the DC/DC converter and the inverter if such an event is detected is generally provided. Such an event is often tentative due to external factors (for example, variation of a trolley voltage), and thus it is configured such that recovery to a normal operation is possible by restarting the DC/DC converter and the inverter by a reset manipulation or the like by a driver.

In such a system, when the DC/DC converter is abnormally shut down due to a failure or the like while the electric vehicle is performing power running in the electrified section, the power received from the overhead wire via the DC/DC converter becomes zero. Therefore, all the power supplied to the inverter is supplied from the power storage element. When the capacity of the power storage element is sufficient and all the power required for power running of the electric vehicle can be supplied from the power storage element, the power supplied to the inverter before and after the shutdown of the DC/DC converter does not change. Therefore, the motor is normally driven, and power running of the electric vehicle is continued without any change before and after the shutdown of the DC/DC converter.

If the electric vehicle continues power running in this state, the charged amount of the power storage element decreases, and in the end, the power storage element may become an over-discharged state, and thus power supply to the inverter cannot be performed, and the electric vehicle may not be able to run.

Furthermore, in an electric vehicle in which a motor is driven by selectively receiving power supply from an overhead wire or power supply from a power storage element by an inverter and a DC/DC converter is used to charge the power storage element during running in an electrified section, if a driver does not realize the shutdown of the DC/DC converter, there may be a trouble such that when the electric vehicle enters into a non-electrified section from the electrified section, the charged amount required for running in the non-electrified section cannot be ensured and the electric vehicle cannot run in the non-electrified section.

To prevent occurrence of such a trouble, such a configuration can be considered that if the DC/DC converter shuts down, a pilot lamp on a cab is activated or it is displayed on an instrumental monitoring device on the cab that the DC/DC converter is shut down, thereby prompting the driver to restart the DC/DC converter. However, such a case can be considered that the driver does not realize these displays and continues power running. Therefore, it is hardly understood that the occurrence of such troubles described above can be avoided sufficiently, and further preventive measures are desired.

The present invention has been achieved to solve the above problems, and an object of the present invention is to provide a control device for an electric vehicle that drives a motor by using power from an overhead wire and power from a power storage element at the same time, in which when a DC/DC converter is shut down, a driver can be prompted to restart the DC/DC converter appropriately.

Solution to Problem

In order to solve above-mentioned problems and achieve the object, according to an aspect of the present invention, there is provided a control device for an electric vehicle including a first power conversion unit that converts a voltage input from an external power supply to a direct current having a predetermined value and inputs the direct current to a power storage element; a second power conversion unit that receives an arbitrary power supply from the external power supply or the power storage element and converts power to an alternating current having a predetermined value; an abnormality detection unit that detects an abnormal state of the first power conversion unit; a first control unit that controls the first power conversion unit based on a detection result of the abnormality detection unit and generates a protection status signal based on the detection result; and a second control unit that executes emergency control with respect to the second power conversion unit, when the protection status signal is input, which indicates that the first power conversion unit is in an abnormal state.

Advantageous Effects of Invention

According to the present invention, because a control operation of a second power conversion unit is switched according to an abnormal state detection result of a first power conversion unit, a driver can be notified of shutdown of the first power conversion unit and prompted to restart the first power conversion unit. With this configuration, it is possible to prevent a case where the driver does not realize the shutdown of the first power conversion unit and continues an operation of an electric vehicle, thereby causing over-discharge from the power storage element. Furthermore, it is possible to avoid such a trouble that, when the electric vehicle enters into a non-electrified section from an electrified section, the charged amount of the power storage element becomes insufficient.

DESCRIPTION OF EMBODIMENTS

Exemplary embodiments of a control device for an electric vehicle according to the present invention will be explained below in detail with reference to the accompanying drawings. The present invention is not limited to the embodiments.

First Embodiment

Figure 1:
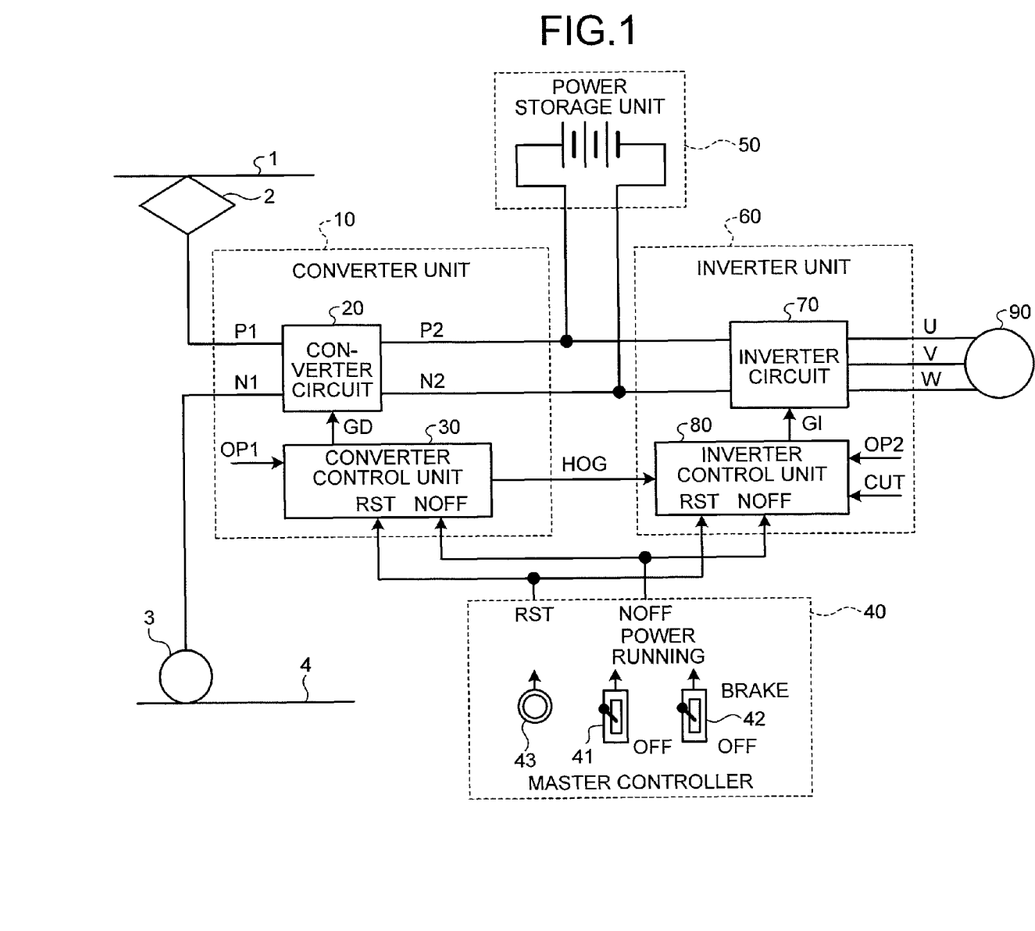
FIG. 1 is a configuration example of a control device for an electric vehicle according to a first embodiment.

FIG. 1 is a configuration example of a control device for an electric vehicle according to a first embodiment. The control device for an electric vehicle according to the present embodiment includes a converter unit 10, a master controller 40, a power storage unit 50, an inverter unit 60, and a motor 90 as main constituent elements. As shown in FIG. 1, power from an electric power substation (not shown) as an external power supply, is input to the converter unit 10, which is, for example, a DC/DC converter, via a power collector 2 from an overhead wire 1. A return current from the converter unit 10 is connected to a rail 4 via wheels 3, and returns to a negative side of the electric power substation (not shown).

The converter unit 10 is a main circuit that performs DC/DC conversion, and includes a converter circuit 20 that operates as a first power conversion unit, and a converter control unit 30 as a first control unit. A bidirectional step-up/step-down chopper circuit is suitable for the converter circuit 20. Although details thereof are explained later, the converter circuit 20 generally includes a filter circuit constituted by a reactor and a capacitor for smoothing a voltage and a current on an input side and an output side.

An output of the converter unit 10 is branched into two systems, and the inverter unit 60 is connected to one of the systems. The inverter unit 60 is a main circuit that performs DC/AC conversion, and includes an inverter circuit 70 that operates as a second power conversion unit, and an inverter control unit 80 as a second control unit. As the inverter circuit 70, a voltage-type PWM inverter circuit is suitable, and the circuit configuration thereof is well known, and thus explanations thereof will be omitted. Also, it is a common procedure that a filter circuit constituted by a reactor for smoothing a voltage and a current and a capacitor is provided on the input side thereof similarly to the converter circuit 20 described above.

The motor 90 is connected to an AC output side of the inverter unit 60. A plurality of motors 90 can be connected in parallel. The motor 90 drives the wheels 3 to cause the electric vehicle to run.

The power storage unit 50 configured by connecting power storage elements such as a secondary battery or an electric double layer capacitor serially and in parallel is connected to one of the two-system outputs of the converter unit 10. Charge and discharge of the power storage unit 50 are controlled with a predetermined current by the converter unit 10, and the power storage unit 50 supplies power for power running to the inverter unit 60 and absorbs regenerative power from the inverter unit 60.

The inverter unit 60 can be an inverter of an auxiliary power-supply device that supplies power to an auxiliary machine such as an air conditioning system or a lighting equipment in a vehicle (not shown). In this case, the configuration becomes such that the motor 90 is replaced by the auxiliary machine in FIG. 1. The configuration and the connection relation of other constituents (such as the converter unit 10) are the same, regardless of the purpose of the inverter unit 60 (regardless of a supply destination of power).

The master controller 40 is provided on a cab of the electric vehicle, and includes switches and levers for inputting an operation control command to the converter unit 10 and the inverter unit 60 by a driver. For example, as shown in FIG. 1, the master controller 40 includes a power-running accelerator lever 41 for adjusting a power-running accelerating force of the electric vehicle, a brake lever 42 for adjusting a braking force, and a reset switch 43 for resetting the converter unit 10 and the inverter unit 60 when an abnormality has occurred therein. Other switches and levers are not shown.

The operation control command is generated by a switch manipulation of the driver, and includes a power, running command and a braking force command for adjusting acceleration and deceleration of an electric vehicle (not shown), and a reset signal RST and a neutral position (neutral) signal NOFF described later.

The reset signal RST is generated by restarting the device according to the judgment of the driver, when the operation of the device is temporarily shut down due to occurrence of abnormality such as overvoltage or overcurrent in the converter unit 10 or the inverter unit 60. Specifically, the reset signal RST is a signal generated when the driver manipulates the reset switch 43 (in which the state changes).

The neutral position (neutral) signal NOFF is a signal generated when the power-running accelerator lever 41 is set to a power-running OFF position (selected when power running acceleration is not performed and coasting run is performed), or when the brake lever 42 is set to a brake OFF position (selected at the time of releasing a brake pedal) (in which the state changes).

The reset signal RST and the neutral position signal NOFF are input to the converter control unit 30 and the inverter control unit 80.

Furthermore, the reset signal RST and the neutral position signal NOFF can have a configuration in which these signals are input only to either one control unit of the converter control unit 30 and the inverter control unit 80, and the states of the reset signal RST and the neutral position signal NOFF are transmitted to the other control unit from the control unit having received the input, other than the configuration of FIG. 1, that is, a configuration in which the respective signals are input to the converter control unit 30 and the inverter control unit 80 directly.

Further, the configuration can be such that the reset signal RST and the neutral position signal NOFF are input to an overall control unit (not shown) including the functions of the converter control unit 30 and the inverter control unit 80 and the input reset signal RST and the neutral position signal NOFF are transmitted to the converter control unit 30 and the inverter control unit 80. In other words, any configuration can be used as long as the configuration is such that the reset signal RST and the neutral position signal NOFF are input to the converter control unit 30 and the inverter control unit 80.

Figure 2:
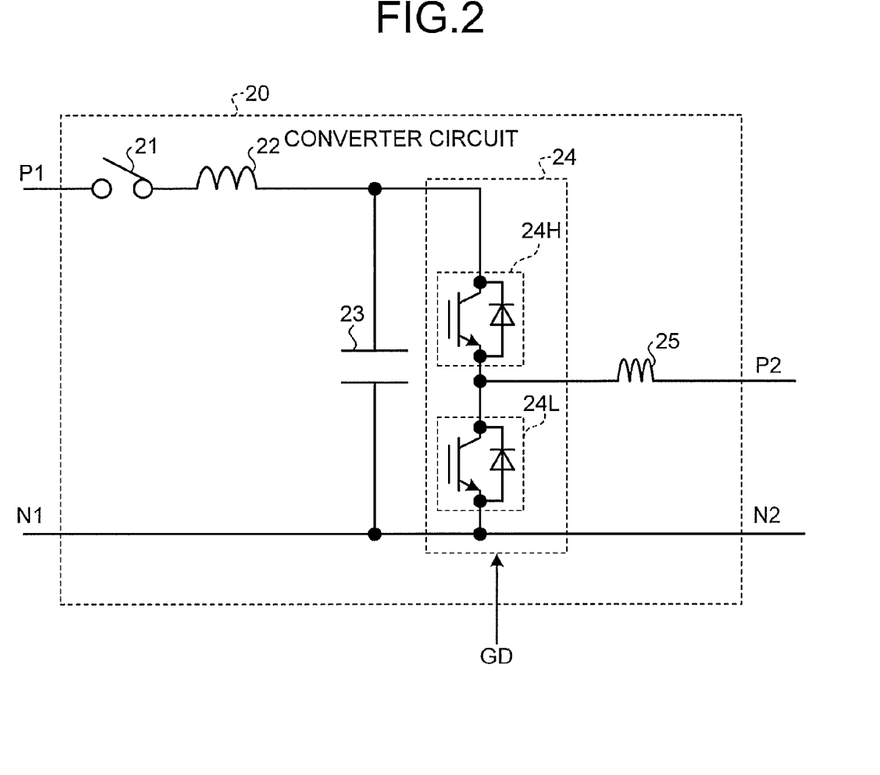
FIG. 2 is a configuration example of a converter circuit.

FIG. 2 is a configuration example of the converter circuit 20 according to the first embodiment of the present invention. As shown in FIG. 2, the converter circuit 20 includes a switch 21, which is an opening/closing unit provided on the input side of power supplied from the overhead wire 1, a filter circuit constituted by a filter reactor 22 for smoothing a voltage and a current and a filter capacitor 23, a switching circuit 24 constituted by an upper-arm switching element 24H and a lower-arm switching element 24L, and a smoothing reactor 25 connected to the secondary side of the switching circuit 24. The converter circuit 20 can cause power having an arbitrary magnitude to pass therethrough in an arbitrary direction, from the primary side to the secondary side, and from the secondary side to the primary side, by appropriately performing on/off control of the upper-arm switching element 24H and the lower-arm switching element 24L.

The configuration of the converter unit 10 can be a circuit configuration other than the configuration shown in FIG. 2. For example, an example in which DC power is supplied from the overhead wire 1 is shown in FIG. 1. However, when AC power is supplied from the overhead wire 1, a PWM converter circuit, which is a circuit that can convert the input AC power to the DC power bidirectionally, is suitable for the converter circuit 20.

Furthermore, in the present embodiment, the control device including the converter unit 10, the inverter unit 60, and the power storage unit 50 one each is explained. However, even if these units are provided in plural, the present invention can be enforced. When a plurality of converter units 10 and inverter units 60 are provided, the reset signal RST and the neutral position signal NOFF are input to the converter control unit 30 of each of the converter units 10 and the inverter control unit 80 of each of the inverter units 60.

Figure 3:
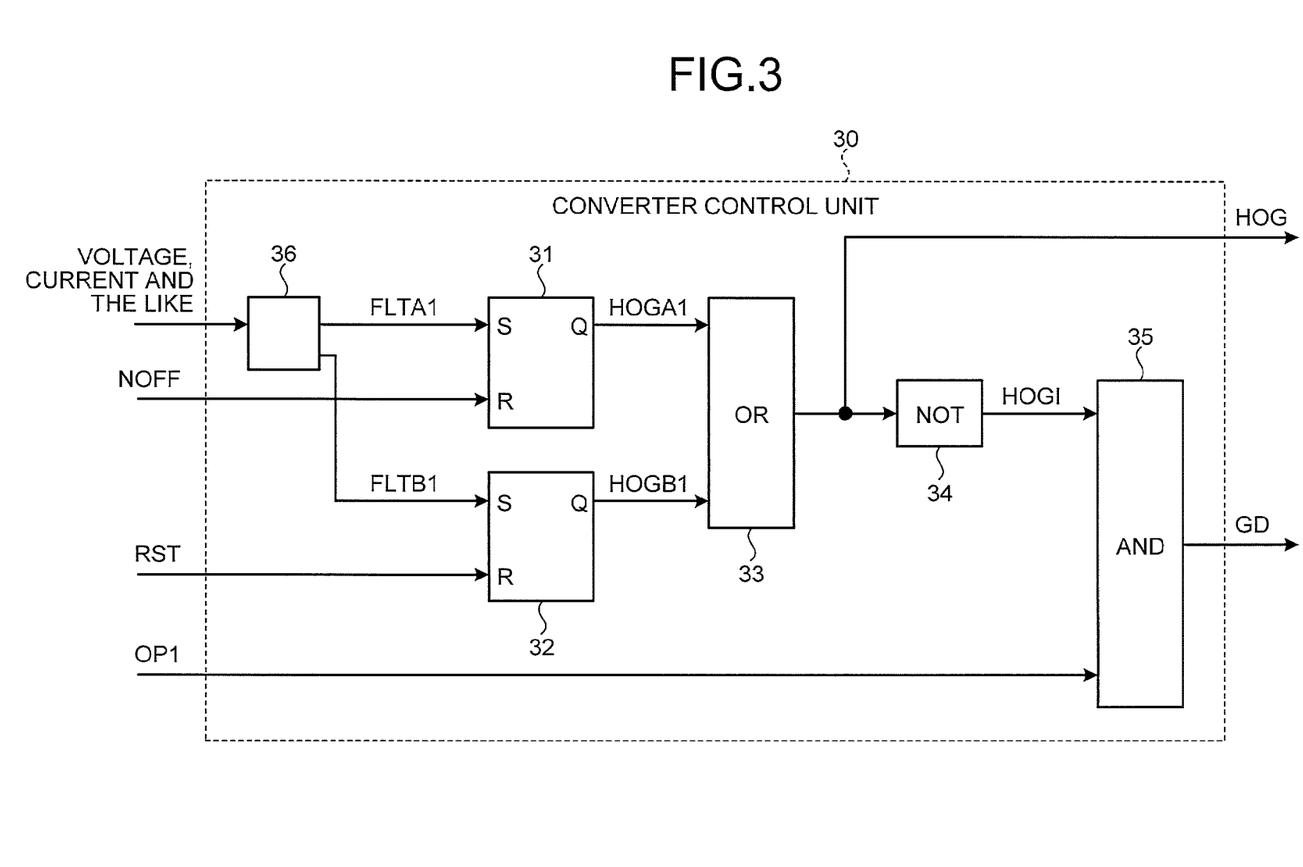
FIG. 3 is a configuration example of a converter control unit.

The configuration of the converter control unit 30 is explained next. FIG. 3 is a configuration example of the converter control unit 30 according to the first embodiment of the present invention. As shown in FIG. 3, the converter control unit 30 includes an abnormality detection unit 36, latch circuits 31 and 32, a logical ADD circuit (OR circuit) 33, an inversion circuit (NOT circuit) 34, and a logical AND circuit (AND circuit) 35.

In the converter control unit 30, the abnormality detection unit 36 detects an abnormal state of the voltage and current in the converter unit 10, and generates abnormal signals FLTA1 and FLTB1.

The abnormality detection unit 36 monitors, for example, the voltage and current in the circuit, and when these current and voltage exceed a predetermined threshold, the abnormality detection unit 36 determines that overvoltage or overcurrent has occurred to turn on the signal FLTA1 (an H level). A case where the signal FLTA1 is ON can occur due to a disturbance such as a voltage fluctuation of the external power supply, and the possibility of occurrence of a device failure is low. Furthermore, when the abnormality detection unit 36 detects large abnormality leading to a damage of the circuit, the abnormality detection unit 36 turns on the signal FLTB1. A case where the signal FLTB1 is ON is not a temporary event due to a disturbance, but is a case where a device failure may occur, for example, when the overvoltage or overcurrent described above is detected several times in a short time or when abnormality of a microcomputer for control is detected.

That is, when having a detected abnormality that is classified as a slight abnormality, the abnormality detection unit 36 turns on the signal FLTA1 and when having a detected abnormality that is classified as a severe abnormality, the abnormality detection unit 36 turns on the signal FLTB1.

The signal FLTA1 and the signal NOFF are input to the latch circuit 31, and the latch circuit 31 outputs an abnormal state signal HOGA1. The latch circuit 31 turns on the signal HOGA1 as an output, when the signal FLTA1 is turned on even for a short time, and maintains the state until the signal NOFF becomes ON from OFF (an L level).

The signal FLTB1 and the signal RST are input to the latch circuit 32, and the latch circuit 32 outputs an abnormal state signal HOGB1. The latch circuit 32 turns on the signal HOGB1 as an output, when the signal FLTB1 is turned on even for a short time, and maintains the state until the signal RST becomes ON from OFF.

The signal NOFF (the neutral position signal) changes the state thereof from OFF to ON when the OFF position is selected to stop a power-running operation or a braking operation and perform a coasting operation by the power-running accelerator lever 41 or the brake lever 42 of the master controller 40. The signal RST (the reset signal) changes the state thereof from OFF to ON when a driver manipulates the reset switch 43 to reset the abnormality detection state of the converter unit 10 or the inverter unit 60 and restart the converter unit 10 or the inverter unit 60.

As described above, the abnormal state signal HOGA1 turned on when the slight abnormality has occurred is reset by turning on the signal NOFF, and the abnormal state signal HOGB1 turned on when the severe abnormality has occurred is reset by turning on the signal RST. That is, the means of resetting the abnormality detection state is different depending on the seriousness of the abnormality having occurred. When the slight abnormality has occurred, by turning off the power-running accelerator or the brake, the abnormal state signal HOGA1 is reset. When the severe abnormality has occurred, the abnormal state signal HOGB1 is not reset unless the reset switch 43 is particularly handled.

The abnormal state signal HOGA1 and the abnormal state signal HOGB1 are input to the logical ADD circuit 33, and the logical ADD circuit 33 outputs a protection status signal HOG. The protection status signal HOG is input to the inversion circuit 34, and the inversion circuit 34 logically inverts the input protection status signal HOG and outputs the inverted signal as a signal HOGI. The signal HOGI and an operation command signal OP1, which is an input signal from outside, are input to the logical AND circuit 35, and the logical AND circuit 35 performs an AND operation with respect to the input signal and outputs the result as a signal GD.

The operation command signal OP1 is generated by an external high-level control unit (not shown) to control the on/off operation of the switching element in the converter circuit 20. Therefore, in the control device for an electric vehicle according to the present embodiment, when the operation command signal OP1 is ON and the signal HOGI is ON (when the converter unit 10 is not in an abnormal state), the signal GD becomes ON to perform on/off control of the switching element of the converter circuit 20.

Figure 4:
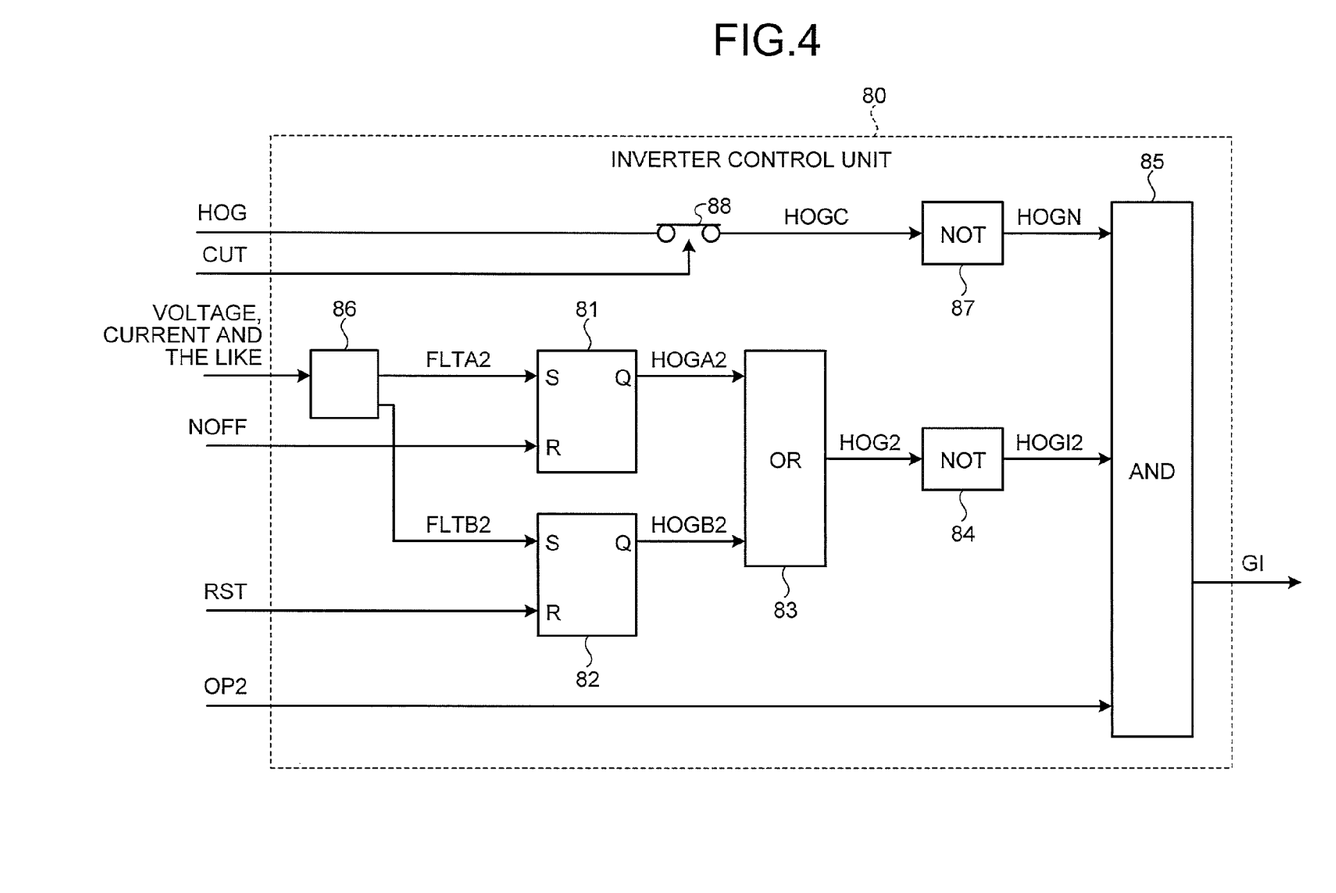
FIG. 4 is a configuration example of an inverter control unit.

The configuration of the inverter control unit 80 is explained next. FIG. 4 is a configuration example of the inverter control unit 80 according to the first embodiment of the present invention. As shown in FIG. 4, the inverter control unit 80 includes an abnormality detection unit 86, latch circuits 81 and 82, a logical ADD circuit (OR circuit) 83, inversion circuits (NOT circuits) 84 and 87, and a logical AND circuit (AND circuit) 85, and a cut-out unit 88.

In the inverter control unit 80, the abnormality detection unit 86 detects an abnormal state of the voltage and current in the inverter unit 60, and generates abnormal signals FLTA2 and FLTB2.

The abnormality detection unit 86 monitors, for example, the voltage and current in the circuit, and when these voltage and current exceed a predetermined threshold, the abnormality detection unit 86 determines that an overvoltage or an overcurrent has occurred to turn on the signal FLTA2. A case where the signal FLTA2 is ON can occur due to a disturbance such as a voltage fluctuation of the external power supply, and the possibility of occurrence of a device failure is low. Furthermore, when the abnormality detection unit 86 detects a large abnormality leading to a damage of the circuit, the abnormality detection unit 86 turns on the signal FLTB2. A case where the signal FLTB2 is ON is not a temporary event due to a disturbance, but is a case where a device failure may occur, for example, when the overvoltage or overcurrent described above is detected several times in a short time or when abnormality of a microcomputer for control is detected.

That is, when having detected an abnormality that is classified as a slight abnormality, the abnormality detection unit 86 turns on the signal FLTA2 and when having detected an abnormality that is classified as a severe abnormality, the abnormality detection unit 86 turns on the signal FLTB2.

The signal FLTA2 and the signal NOFF are input to the latch circuit 81, and the latch circuit 81 outputs an abnormal state signal HOGA2. The latch circuit 81 turns on the signal HOGA2 as an output, when the signal FLTA2 is turned on even for a short time, and maintains the state until the signal NOFF becomes ON from OFF.

The signal FLTB2 and the signal RST are input to the latch circuit 82, and the latch circuit 82 outputs an abnormal state signal HOGB2. The latch circuit 82 turns on the signal HOGB2 as an output, when the signal FLTB2 is turned on even for a short time, and maintains the state until the signal RST becomes ON from OFF.

As described above, the abnormal state signal HOGA2 turned on when the slight abnormality has occurred is reset by turning on the signal NOFF, and the abnormal state signal HOGB2 turned on when the severe abnormality has occurred is reset by turning on the signal RST. That is, the means of resetting the abnormality detection state is different depending on the seriousness of the abnormality having occurred. When the slight abnormality has occurred, by turning off the power-running accelerator or the brake, the abnormal state signal HOGA2 is reset. When the severe abnormality has occurred, the abnormal state signal HOGB2 is not reset unless the reset switch 43 is particularly handled.

The abnormal state signal HOGA2 and the abnormal state signal HOGB2 are input to the logical ADD circuit 83, and the logical ADD circuit 83 outputs a protection status signal HOG2. The protection status signal HOG2 is input to the inversion circuit 84, and the inversion circuit 84 logically inverts the input protection status signal HOG2 and outputs the inverted signal as a signal HOGI2. The signal HOGI2, an operation command signal OP2, which is an input signal from outside, and a signal HOGN (details thereof will be explained later) are input to the logical AND circuit 85, and the logical AND circuit 85 performs an AND operation with respect to the input signal and outputs the result as a signal GI.

The signal HOGN described above is acquired by inputting the protection status signal HOG input from the converter control unit 30 to an inversion circuit 87 via the cut-out unit 88 and logically inverting the signal by the inversion circuit 87. When a cut-out command signal CUT is ON (an H level), the cut-out unit 88 cuts the input signal HOG from the converter control unit 30 and turns off the signal HOGC (an L level). The cut-out command signal CUT is input from outside (from a cab, for example) according to the manipulation of a driver (a manipulation different from the reset manipulation for turning on the signal RST) (the state thereof is changed to ON).

For example, when the converter unit 10 has a failure, and cannot reset the abnormality detection state and cannot be activated, the signal HOG remains ON and the signal HOGN becomes OFF. Therefore, even if the inverter unit 60 does not have any failure, the inverter unit 60 cannot be operated. However, the inverter control unit 80 is configured to turn on the signal CUT to cut the signal HOG and forcibly set the signal HOGN to H so that the inverter unit 60 can be operated. Accordingly, the inverter unit 60 can be driven only by the power of the power storage unit 50, thereby enabling to avoid a case where although the charged amount of the power storage unit 50 is sufficient, the electric vehicle cannot be driven and is stranded. In this case (when the inverter unit 60 is driven only by power of the power storage unit 50), the signal HOGC needs to be maintained OFF. Therefore, such a mechanism that the cut-out command signal CUT can be maintained in an ON state or after the signal HOGC temporarily becomes OFF and then the OFF state can be maintained is provided. For example, a mechanical switch for setting the state of the cut-out command signal CUT is provided on the cab.

The operation command signal OP2 is generated by the external high-level control unit to control the on/off operation of the switching element in the inverter circuit 70. Therefore, in the control device for an electric vehicle according to the present embodiment, when the operation command signal OP2 is ON and the signal HOGI2 is ON (when the inverter unit 60 is not in an abnormal state) and the signal HOGN is ON (when the converter unit 10 is not in an abnormal state or the cut-out command signal CUT is ON), the signal GI becomes ON to perform on/off operations of the switching element of the inverter circuit 70.

An operation example of the control device for an electric vehicle according to the present embodiment is explained next.

(Operation when a Slight Abnormality has Occurred in the Converter Unit 10)

There is considered a case such that a slight abnormality has occurred in the converter unit 10 due to a disturbance or the like during power running acceleration of the electric vehicle, and the operation of the converter unit 10 is shut down. In this case, in the converter control unit 30 shown in FIG. 3, the abnormality detection unit 36 detects there is a slight failure and sets the signal FLTA1 to H. Therefore, because the output signal HOGA1 from the latch circuit 31 becomes H and the input signal HOGI to the logical AND circuit 35 becomes L, the output signal GD becomes L, thereby turning off the operation of the converter circuit 20.

Simultaneously, the signal HOG to the inverter control unit 80 becomes H, and in the inverter control unit 80 shown in FIG. 4, the input signal HOGN to the logical AND circuit 85 becomes L. Accordingly, even in the case where any abnormality does not occur in the inverter unit 60, the output signal GI from the logical AND circuit 85 is set to L, thereby turning off the operation of the inverter circuit 70 (an operation at the time of occurrence of abnormality). As a result, a generation torque in the motor 90 becomes zero, thereby discontinuing the power running acceleration of the electric vehicle to start a coasting operation.

Although the driver does not set' the power-running accelerator lever 41 to the off (neutral) position, the electric vehicle discontinues acceleration. Therefore, the driver recognizes the abnormality and temporarily sets the power-running accelerator lever 41 to the off position. Accordingly, the signal NOFF becomes H, the latch circuit 31 is reset and the output signal HOGA1 from the latch circuit 31 becomes L, thereby resetting the abnormality in the converter unit 10. As a result, the signal HOG becomes L, and the OFF states (L-level fixed states) of the signal GD from the converter control unit 30 to the converter circuit 20 and the signal GI from the inverter control unit 80 to the inverter circuit 70 are released to restart the converter unit 10. By setting the power-running accelerator lever 41 to the power running position again, the power running acceleration control of the inverter unit 60 is resumed (returns to a normal operation). As a result, the electric vehicle returns to the normal operating condition.

As described above, when the converter unit 10 is shut down due to the slight abnormality, by shutting down the operation of the inverter unit 60 in conjunction therewith, the driver is caused to recognize the shutdown of the converter unit 10 (an occurrence of the abnormality), and is prompted to restart the converter unit 10. Accordingly, it can be avoided that the driver does not recognize the shutdown of the converter unit 10 and continues the operation of the electric vehicle, thereby causing over-discharge from the power storage unit 50.

(Operation when Severe Abnormality has Occurred in the Converter Unit 10)

On the other hand, when the abnormality having occurred in the converter unit 10 is a severe abnormality, in the converter control unit 30, the abnormality detection unit 36 detects that it is the severe abnormality and sets the signal FLTB1 to H. Therefore, because the output signal HOGB1 from the latch circuit 32 becomes H, and the input signal HOGI to the logical AND circuit 35 becomes L, the output signal GD becomes L, thereby turning off the operation of the converter circuit 20, similarly to a case where slight abnormality has occurred, which has been explained above.

Simultaneously, the signal HOG to the inverter control unit 80 becomes H, and the input signal HOGN of the inverter control unit 80 becomes L. Accordingly, even in the case where any abnormality does not occur in the inverter unit 60, the output signal GI is turned off, thereby turning off the operation of the inverter circuit 70 (an operation at the time of occurrence of abnormality). As a result, the generation torque in the motor 90 becomes zero, thereby discontinuing the power running acceleration of the electric vehicle to start a coasting operation similarly to a case where the slight abnormality has occurred.

Although the driver does not set the power-running accelerator lever 41 of the master controller 40 to the off (neutral) position, the electric vehicle discontinues acceleration. Therefore, the driver recognizes the abnormality and temporarily sets the power-running accelerator lever 41 to the off position. Accordingly, the signal NOFF becomes H, but the latch circuit 32 is not reset and the output signal HOGB1 remains H, and thus the signal GI of the inverter unit 60 remains L (OFF). Therefore, even if the driver sets the power-running accelerator lever 41 to the acceleration position again, the inverter unit 60 does not operate, and thus the electric vehicle does not accelerate. Accordingly, the driver can recognize that the abnormality has not been reset and severe abnormality has occurred.

In this case, the driver confirms the pilot lamps on a monitor screen on a cab to confirm the event, and when having decided to try restart, the driver manipulates the reset switch 43. Accordingly, the signal RST to the latch circuit 32 becomes H to reset the latch circuit 32, and the signal HOGB1 becomes L, thereby resetting the abnormality in the converter unit 10. As a result, the signal HOG becomes L, and the OFF states of the signal GD and the signal GI are released to restart the converter unit 10 (the converter unit 10 returns to a normal operation). By setting the power-running accelerator lever 41 to the power running position, the power running acceleration control of the inverter unit 60 is resumed, and the electric vehicle returns to the normal operating condition.

When the converter unit 10 has a failure, the abnormality detection state cannot be reset even if the reset switch 43 is manipulated, and the converter unit 10 cannot be activated, the signal HOG remains ON (H) and the signal HOGN becomes OFF (L). Therefore, the inverter unit 60 cannot be operated. In such a case, a cut-out manipulation is performed from outside (from a cab, for example) by the driver's manipulation. By the cut-out manipulation, the input signal CUT to the inverter control unit 80 becomes H to cut the signal HOG, and forcibly set the signal HOGN to H, so that the operation of the inverter unit 60 can be resumed (the inverter unit 60 returns to a normal operation). Accordingly, the inverter unit 60 can be driven only by the power of the power storage unit 50, thereby enabling to avoid a case where although the charged amount of the power storage unit 50 is sufficient, the electric vehicle cannot be driven and is stranded.

As described above, when the converter unit 10 is shut down due to the severe abnormality, by shutting down the operation of the inverter unit 60 in conjunction therewith, the driver is caused to recognize the shutdown of the converter unit 10, and is prompted to restart the converter unit 10. Furthermore, in the case of severe abnormality, because the converter unit 10 is not reset only by setting the power-running accelerator lever 41 to the off (neutral) position, the driver can be prompted to confirm an abnormal event. Further, by manipulating the reset switch 43, the abnormality can be reset. Because such an operation becomes possible, it can be avoided that the driver does not recognize shutdown of the converter unit 10 and continues the operation of the electric vehicle, thereby causing over-discharge from the power storage unit 50. Furthermore, when the converter unit 10 has a failure and cannot be operated, the inverter unit 60 can be driven only by the power of the power storage unit 50 by the manipulation of the driver, thereby enabling to avoid a case where although the charged amount of the power storage unit 50 is sufficient, the electric vehicle cannot be driven and is stranded.

An operation when the converter unit 10 has a failure while an electric vehicle is performing power running acceleration has been explained above. However, the flow of the operation when abnormality has occurred while the electric vehicle is braking is identical to that in the case of power running acceleration, except that the brake lever 42 is manipulated by a driver instead of the power-running accelerator lever 41.

It is also possible to consider that the inverter unit 60 includes not only an inverter device that controls the motor that drives the electric vehicle but also an inverter of an auxiliary power-supply device that supplies power to an auxiliary machine such as an air conditioning system or lighting in the electric vehicle.

As described above, the inverter control unit 80 is configured so that the operation of the inverter unit 60 can be shut down, when the signal HOG as the protection status signal indicates that abnormality has occurred in the converter unit 10 (when the signal HOG is H).

When the signal HOG indicates that abnormality has occurred in the converter unit 10 (when the signal HOG is H), the inverter control unit 80 turns off the inverter unit 60. As another method, the configuration can be such that the inverter circuit 70 is controlled so that the acceleration of the electric vehicle decreases. Specifically, such a configuration that the inverter circuit 70 can be controlled so that the torque of the motor 90 is reduced from the normal value (including that the torque is reduced to zero) can be used. With this configuration, the torque generated in the motor 90 can be gradually decreased when the converter unit 10 has an abnormality. Accordingly, such an event can be avoided that "the torque of the motor 90 becomes zero instantaneously, thereby causing a sudden change shock in the acceleration in the vehicle", which occurs at the time of adopting a configuration in which the inverter unit 60 is turned off upon detection of occurrence of the abnormality in the converter unit 10 (the configuration described above), and thus the ride quality of the electric vehicle can be improved. Because the acceleration of the electric vehicle decreases more than the normal time, a driver can recognize an abnormal state.

Furthermore, it is desired that the inverter control unit 80 causes the operation of the inverter unit 60 to return to the original operating condition when the signal HOG indicates that the converter unit 10 has returned to a normal state from an abnormal state (the signal HOG becomes L).

It is desired that the signal HOG is generated to become the H-level signal when the converter unit 10 is in the abnormal state. With this configuration, for example, when a communication line including the signal HOG between the converter control unit 30 and the inverter control unit 80 is cut off due to breaking of wire or the like, the signal HOGN can remain H. Therefore, the inverter unit 60 is not turned off, and the operation of the electric vehicle can be continued.

Further, when the master controller 40 in which the power-running accelerator lever 41 has at least a power-running ON position and a power-running OFF position in order to manipulate acceleration of the electric vehicle is provided, and when the converter unit 10 becomes an abnormal state and is shut down, it is desired to have such a configuration that the abnormal state of the converter unit 10 is reset so that restart becomes possible by setting the power-running accelerator lever 41 to the power-running OFF position. With this configuration, a driver can restart the converter unit 10 only by manipulating the power-running accelerator lever 41 without performing any particular switching manipulation, thereby enabling to minimize the manipulation amount of the driver.

Further, when the master controller 40 in which the brake lever 42 has at least a brake ON position and a brake OFF position in order to manipulate the braking force of the electric vehicle is provided, and when the converter unit 10 becomes an abnormal state and is shut down, it is desired to have such a configuration that the abnormal state of the converter unit 10 is reset so that restart becomes possible by setting the brake lever 42 to the brake OFF position. With this configuration, a driver can restart the converter unit 10 only by manipulating the brake lever 42 without performing any particular switching manipulation, thereby enabling to minimize the manipulation amount of the driver.

It is also preferable to be configured such that the converter control unit 30 outputs the signal HOG as an H level to the inverter unit 60 only in a state where the main circuit (the converter circuit) of the converter unit 10 is energized and being operated and when the abnormality detection unit 36 has detected an abnormal state. When the main circuit of the converter unit 10 is not energized, for example, when the main circuit of the converter unit 10 is not energized and the control power supply is turned on only to the converter control unit 30 at the time of running in a non-electrified section, for example, it is preferable to mask the operation of the abnormality detection unit 36. With this configuration, for example, when the converter unit 10 is intentionally shut down due to a reason that the electric vehicle is running in the non-electrified section, it is possible to avoid a case where the level of the signal HOG to the inverter unit 60 becomes H erroneously due to an exogenous noise or a malfunction of the abnormality detection unit 36 so as to turn off the inverter unit 60. Therefore, the possibility of an event in which the inverter unit 60 is unnecessarily turned off can be eliminated, thereby enabling to improve the redundancy and the reliability of the electric vehicle.

When the converter unit 10 includes the switch 21 as an opening/closing unit between the external power supply and the converter unit 10, it is desired that the converter control unit 30 outputs the signal HOG as the H level to the inverter control unit 80, only when the switch 21 is in an ON state and the abnormality detection unit 36 has detected an abnormal state. With this configuration, for example, when the converter unit 10 is intentionally shut down (when the switch 21 is OFF) due to a reason that the electric vehicle is running in a non-electrified section, it is possible to avoid a case where the level of the signal HOG to the inverter unit 60 becomes H erroneously due to an exogenous noise or a malfunction of the abnormality detection unit 36 so as to turn off the inverter unit 60. Therefore, the possibility of occurrence of an event in which the inverter unit 60 is unnecessarily turned off can be eliminated, thereby enabling to improve the redundancy and the reliability of the electric vehicle.

Furthermore, it is desired to have such a configuration that when a slight abnormality has occurred in the converter unit 10, which is assumed due to a factor such as a disturbance, the converter unit 10 can be restarted by setting the power-running accelerator lever 41 or the brake lever 42 of the master controller 40 to the power-running off position or the brake off position, and when a severe abnormality has occurred, which is assumed due to a failure of the device or the like, the converter unit 10 can be restarted by manipulating the reset switch 43. With this configuration, when a slight abnormality has occurred due to the factor such as a disturbance, which can occur frequently, a driver can restart the converter unit 10 only by manipulating the power-running accelerator lever 41 or the brake lever 42 without requiring any particular switching manipulation, thereby enabling to minimize the manipulation amount of the driver. Further, in the case of a severe abnormality in which a failure of the device is assumed, the driver can be prompted to confirm an abnormal event. Further, in an event in which the converter unit 10 can be returned to a normal state, an abnormal state can be reset by manipulating the reset switch.

As explained above, according to the control device for an electric vehicle according to the present embodiment, when the converter unit 10 is shut down due to an abnormality, the operation of the inverter unit 60 is shut down in conjunction therewith, thereby causing a driver to recognize the shutdown of the converter unit 10, and prompting the driver to restart the converter unit 10. Because such an operation can be performed, it can be avoided that the driver does not recognize the shutdown of the converter unit 10 and continues the operation of the electric vehicle, thereby causing over-discharge from the power storage unit 50. Further, such a trouble can be avoided that the charged amount of the power storage unit 50 becomes insufficient when the electric vehicle enters into a non-electrified section from an electrified section.

Second Embodiment

Figure 5:
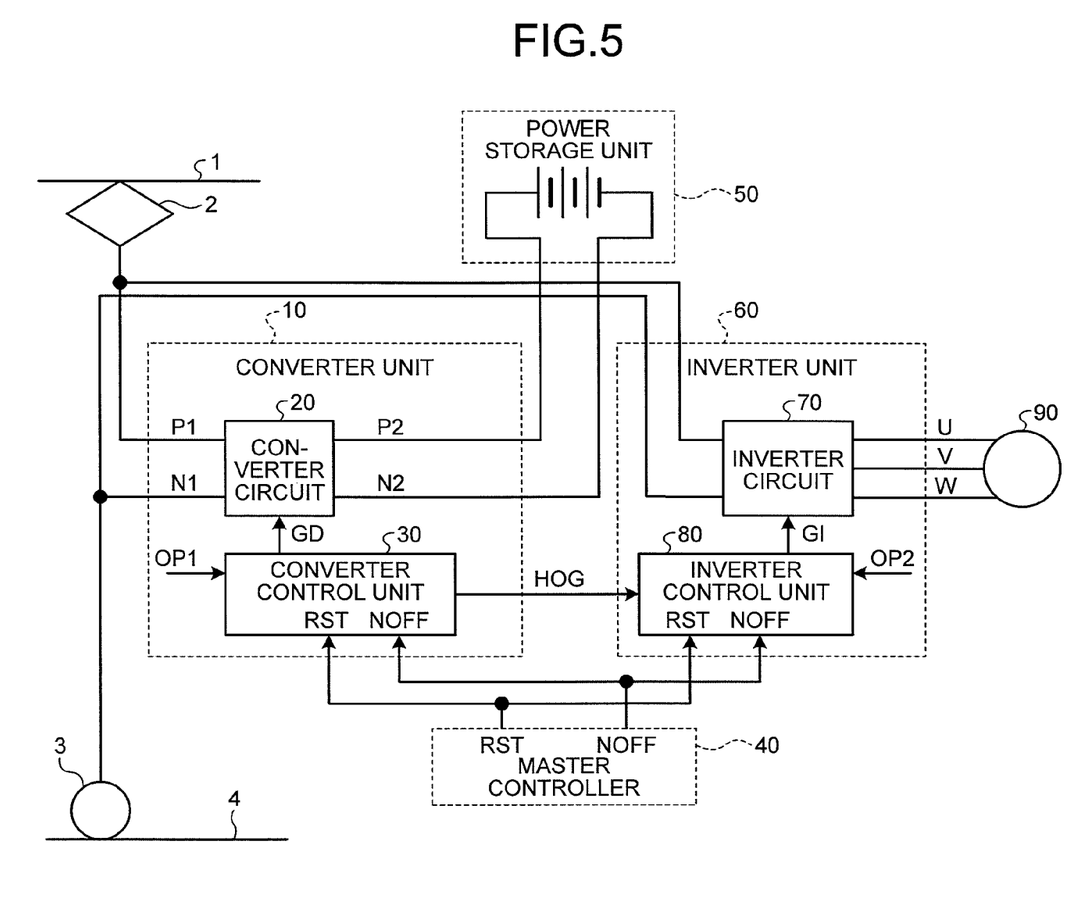
FIG. 5 is a configuration example of a control device for an electric vehicle according to a second embodiment.

FIG. 5 is a configuration example of a control device for an electric vehicle according to a second embodiment. The control device for an electric vehicle has the same configuration as that of the first embodiment, except that a connection mode among the converter unit 10, the inverter unit 60, and the power storage unit 50 is different from that of the first embodiment shown in FIG. 1.

In the configuration shown in FIG. 5, the converter unit 10 and the inverter unit 60 connected to the power storage unit 50 are connected to the power collector 2 in a parallel relation.

As shown in FIG. 5, the inverter unit 60 is configured to be able to drive the motor 90 by using power acquired from the overhead wire 1 via the power collector 2 and power acquired from the power storage unit 50 via the converter unit 10.

When the charged amount of the power storage unit 50 has decreased, the converter unit 10 performs charge by the power acquired from the power collector 2. Charge can be performed by the regenerative power from the inverter unit 60.

In the system (the control device for an electric vehicle) having such a configuration, when the converter unit 10 has an abnormality and is shut down, a charge and a discharge to the power storage unit 50 cannot be performed. However, because the inverter unit 60 can operate as normal by receiving power from the power collector 2, a driver may not recognize the occurrence of the abnormality in the converter unit 10. This problem is common to that in the system described in the first embodiment.

Particularly, when such a state that the charge to the power storage unit 50 cannot be performed continues, for example, the charged amount of the power storage unit 50 may become insufficient when the electric vehicle enters into a non-electrified section from an electrified section. Therefore, the driver needs to recognize the shutdown of the converter unit 10 due to occurrence of the abnormality reliably.

Therefore, the configurations of the converter control unit 30 and the inverter control unit 80 are made the same as those described in the first embodiment. Accordingly, when an abnormality has occurred in the converter unit 10 and the converter unit 10 is shut down, the inverter unit 60 can be shut down, thereby enabling to cause a driver to recognize the occurrence of abnormality. Other effects of the second embodiment are identical to those of the first embodiment.

In the respective embodiments described above, it has been explained that a manipulation of the master controller 40 and a cut-out manipulation are performed by a driver. However, instead of a driver, the manipulation can be performed by remote control or by an automatic operation system.

The configuration described in the respective embodiments is only an example of the contents of the present invention, and the configuration can be combined with other well-known techniques, and it is needless to mention that the present invention can be configured while modifying it without departing from the scope of the invention, such as omitting a part of the configuration.

INDUSTRIAL APPLICABILITY

As described above, the control device for the electric vehicle according to the present invention is useful as a control device for an electric vehicle that use power from an overhead wire and power from a power storage element at the same time.

Reference Signs List 1 overhead wire
2 power collector
3 wheel
4 rail
10 converter unit
20 converter circuit (first power conversion unit)
21 switch
22 filter reactor
23 filter capacitor
24 switching circuit
24H upper-arm switching element
24L lower-arm switching element
25 smoothing reactor
30 converter control unit (first control unit)
31, 32, 81, 82 latch circuit
33, 83 logical ADD circuit
34, 84, 87 inversion circuit
35, 85 logical AND circuit 36, 86 abnormality detection unit
40 master controller
41 power-running accelerator lever
42 brake lever
43 reset switch
50 power storage unit
60 inverter unit
70 inverter circuit (second power conversion unit)
80 inverter control unit (second control unit)
88 cut-out unit
90 motor

The invention claimed is:

1. A control device for an electric vehicle comprising:
a first power conversion unit that converts a voltage input from an external power supply to a direct current having a predetermined value and outputs the direct current to a power storage element;
a second power conversion unit that receives an arbitrary power supply from the external power supply or the power storage element and converts power to an alternating current having a predetermined value;
an abnormality detection unit that detects an abnormal state of the first power conversion unit;
a first control unit that controls the first power conversion unit based on a detection result of the abnormality detection unit and generates a protection status signal based on the detection result; and
a second control unit that executes emergency control with respect to the second power conversion unit, when the protection status signal is input, which indicates that the first power conversion unit is in an abnormal state.

2. The control device for an electric vehicle according to claim 1, wherein the second power conversion unit is an inverter device that controls a motor that drives the electric vehicle.

3. The control device for an electric vehicle according to claim 1, wherein the second power conversion unit is an auxiliary power-supply device for supplying power to an auxiliary machine such as an air conditioning system or a lighting equipment in an electric vehicle.

4. The control device for an electric vehicle according to claim 1, wherein the second control unit executes control to shut down an operation of the second power conversion unit, as the emergency control.

5. The control device for an electric vehicle according to claim 1, wherein the second control unit executes control to decrease an acceleration of an electric vehicle, as the emergency control.

6. The control device for an electric vehicle according to claim 2, wherein the second control unit executes control to decrease a torque generated by the motor, as the emergency control.

7. The control device for an electric vehicle according to claim 1, wherein when the protection status signal indicates that the first power conversion unit is returned to a normal state, the second control unit causes an operation of the second power conversion unit to return to an original operating condition.

8. The control device for an electric vehicle according to claim 1, wherein when having detected an abnormal state of the first power conversion unit, the first control unit changes the protection status signal to an H level.

9. The control device for an electric vehicle according to claim 1, further comprising a master controller having a power-running accelerator lever that selects at least a power-running ON position and a power-running OFF position in order to manipulate acceleration of the electric vehicle, wherein
when the first power conversion unit becomes an abnormal state and is shut down, the first power conversion unit is restarted by setting the power-running accelerator lever to the power-running OFF position.

10. The control device for an electric vehicle according to claim 1, further comprising a master controller having a brake lever that selects at least a brake ON position and a brake OFF position in order to manipulate a braking force of the electric vehicle, wherein
when the first power conversion unit becomes an abnormal state and is shut down, the first power conversion unit is restarted by setting the brake lever to the brake OFF position.

11. The control device for an electric vehicle according to claim 1, wherein the first control unit has such a configuration that when the first power conversion unit is in an energized and active state, and the abnormality detection unit detects an abnormal state, the protection status signal indicates the abnormal state of the first power conversion unit.

12. The control device for an electric vehicle according to claim 1, wherein
the first power conversion unit includes an opening/closing unit between an external power supply and the first power conversion unit, and
the first control unit has such a configuration that when the opening/closing unit is in an ON state and the abnormality detection unit detects an abnormal state, the protection status signal indicates the abnormal state of the first power conversion unit.

13. The control device for an electric vehicle according to claim 1, further comprising a master controller having any one of a power-running accelerator lever that selects at least a power-running ON position and a power-running OFF position in order to manipulate acceleration of the electric vehicle, and a brake lever that selects at least a brake ON position and a brake OFF position in order to manipulate a brake force of the electric vehicle, wherein
when a predetermined slight abnormality occurs in the first power conversion unit, the first power conversion unit is restarted by setting the power-running accelerator lever to the power-running OFF position or setting the brake lever to the brake OFF position, or when predetermined a severe abnormality occurs in the first power conversion unit, the first power conversion unit is restarted by manipulating a reset switch provided separately.

14. The control device for an electric vehicle according to claim 1, wherein the second control unit includes a cut-out unit that cuts out the protection status signal input from the first control unit based on a cut-out signal input separately, so that the second power conversion unit is controlled to operate normally regardless of the protection status signal.

15. The control device for an electric vehicle according to claim 1, wherein the power storage unit and the second power conversion unit are connected in parallel to an output side of the first power conversion unit, with an input side thereof connected to the external power supply, and when the second power conversion unit receives a power supply from the external power supply, the power supply is received via the first power conversion unit.

16. The control device for an electric vehicle according to claim 1, wherein the first power conversion unit and the second power conversion unit are connected in parallel to the external power supply, and the power storage unit is connected to an output side of the first power conversion unit, and when the second power conversion unit receives a power supply from the power storage unit, the power supply is received via the first power conversion unit.

* * * * *